United States Patent [19]

Fohl

[11] Patent Number: 4,597,544
[45] Date of Patent: Jul. 1, 1986

[54] SAFETY BELT RETRACTOR

[75] Inventor: Artur Fohl, Schorndorf, Fed. Rep. of Germany

[73] Assignee: TRW Repa GmbH, Alfdorf, Fed. Rep. of Germany

[21] Appl. No.: 691,693

[22] Filed: Jan. 15, 1985

[51] Int. Cl.⁴ .................... B60R 22/38; B60R 22/40; B60R 22/46

[52] U.S. Cl. .................... 242/107.4 B; 242/107.4 A

[58] Field of Search ................. 242/107.4 B, 107.4 A; 280/806; 297/478

[56] References Cited

U.S. PATENT DOCUMENTS 4,083,512  4/1978  Rumpf ..................... 242/107.43 X Primary Examiner—John M. Jillions
Attorney, Agent, or Firm—Yount & Tarolli

[57] ABSTRACT

A safety belt retractor has a belt spool which is rotatably supported on a frame. A belt slack retightening mechanism is positively coupled to the belt spool to drive the belt spool in a direction upon occurrence of excessive deceleration of the vehicle. A blocking device is operable to block the belt spool from rotation. A control apparatus is provided to control the blocking device in response to acceleration of belt webbing withdrawal from the belt spool.

The control apparatus includes a control disc which is supported for limited relative rotation with respect to the belt spool. An inertial disc is coupled with the control disc for rotation therewith by a coupling. The coupling permits rotation of the inertial disc with respect to the control disc only upon the exceeding of a predetermined retightening rotational acceleration of the belt spool and control disc.

8 Claims, 8 Drawing Figures

SAFETY BELT RETRACTOR

The invention relates to a safety belt retractor.

In known safety belt retractors of this kind, there is supported on the belt spool, a rotatable control disc, of plastic, for example, which serves to transmit a control movement, coming from a sensor, to a catch device, and to effect a blocking of the belt shaft in case of danger. Teeth on the outer circumference of the control disc cooperate with a vehicle-sensitive sensor, for example, a ball sensor so that, with the actuation of the sensor, the control disc is instantly blocked through a catch. Between the control disc and the belt shaft provided with the catch device, a relative movement takes place, which effects through a control cam provided on the control disc, a movement of the blocking catch of the catch device into a stationary blocking condition. Also known is the permanent arrangement, on the control disc, of an inertia mass disc, of metal, for example, which with strongly accelerated belt pull, effects because of the mass inertia, a relative rotation between the control disc and belt spool, which relative rotation is used, in turn, for the movement of the blocking catch. Now when such a safety belt roll up is provided with a belt band tightening-back device, consisting, for example, of a cable disc, coupled to the belt spool, with tightening-back, cable, drive piston and pyrotechnic propellent, then with the release of the propellent, the belt coil is moved at very high angular acceleration in backward rotation for the tightening back of the belt band. This direction of rotation is reversed for the normal blocking direction of the belt band. With this extreme backward rotation, the whole blocking system is rotated at the same time, since the control disc is rotatable by only a certain angular distance in relation to the belt spool; that is, it is supported stop-limited against the belt spool. With the end of the tightening-back process, with the contact of the belt band against the body of the person to be secured, the belt is abruptly braked, while the masses loosely supported thereon; thus, for example, the control disc and especially the mass disc, exert a very high force on the control elements connected after them, which can lead to the destruction of the said parts, especially when such a safety belt roll up is of light construction, that is, when the control elements and the like are made of a light plastic.

The invention attacks the problem of designing a safety belt retractor so that in the tightening back movement no harmful influences on the belt spool blocking device are to be feared, even when the safety belt retractor is of light construction.

Through the special coupling connection between mass disc and control disc, if a predetermined tightening-back acceleration is exceeded, it is assured that the solid coupling engagement of mass disc and control disc is released, and the mass disc is freely rotatable in relation to the control disc, and, for example, can continue to turn freely, like a flywheel. In this way, the movement forces originating from the relatively great mass of the mass disc can no longer be transmitted to the other parts of the belt spool blocking device, so that a destruction of same is surely prevented.

According to advatageous developments of the invention, the coupling element may be designed as a shear element or as a slide coupling.

After overcoming the coupling forces, the coupling still retains its function, that is, the turning on of the control disc through the belt band sensitive sensor, and thus through the mass disc itself, is possible in full extent, even directly after the tightening-back process.

Here, no disturbing influences, such as friction or environmental influences can have a disturbing effect.

Other advantageous details of the invention will appear from the examples represented in the drawings and described below.

Figure 1:
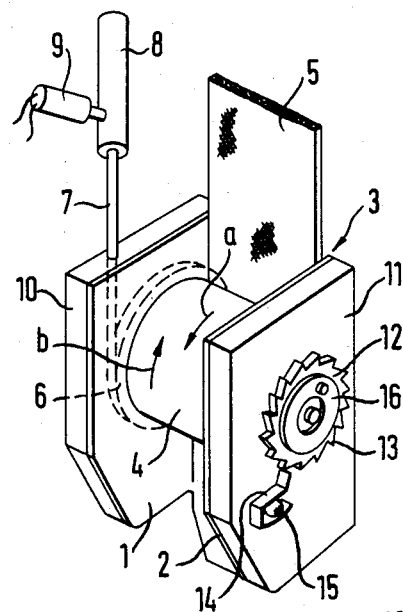
FIG. 1 is a perspective view of the safety belt roll up according to the invention.

FIG. 1 shows the basic structure of the safety belt roll up according to the invention. Here, between the two legs 1 and 2 of a U-shaped roll up frame 3, a belt spool 4, with a belt winding of the flexible belt band 5 wound up on it, is rotatably supported. Engaged with the belt spool 4 is a winding-back spring (not shown), a belt band tightening-back device and a belt spool blocking device. A component of the tightening-back device is, for example, a cable disc (pulley) 6, which can be coupled with the belt spool 4 in case of danger, and on which is wound a tightening-back cable 7, which is connected with a drive piston within a drive cylinder 8, which is connected on the pressure side with a pyrotechnic propellent, ignitable electrically, within a housing 9. With the ignition of the propellent (explosive) the drive piston in the drive cylinder in FIG. 1 is moved upward, connected with a coupling of the cable pulley 6 with the belt spool, with a tighening-back rotation of the belt spool and with the tightening of the belt band 5 until it comes in contact with the body of the person to be secured. The cable pulley 6, and possibly the rewinding spring arranged at its side, lies within a covering 10. On the other side of the roll up frame 3, also mainly within a covering 11, is a catch device, of the known kind, with, for example, a blocking catch supported swingable on a flange of the belt spool 4, which cooperates with stationary blocking teeth arranged on the leg 2 of the roll up frame 3. On an addition of the belt spool 4 is supported, freely rotatable within a predetermined angular distance, against the force of a spring (not shown), a control disc 12, arranged outside the cover 11, with outer control teeth 13, which control teeth 13 cooperate with a control lever 14 of a vehicle-sensitive ball sensor 15. Connected with the control disc 12, of plastic, for example, is a metal mass disc 16, which constitutes a belt-band-sensitive sensor. In case of a sudden slowing or acceleration of the vehicle, the sensor 15 reacts so that the control lever 14 engages in the control teeth 13, and blocks the control disc 12. With this, there takes place a relative movement between the belt spool 4, turning further, and the blocked control disc 12, while a control member 12a, for example, according to FIG. 2a, runs up on the control catch inside the covering 11, and moves this into the permanent blocking teeth, so that the belt spool 4 is blocked. As an alternative to this blocking, a blocking of the belt spool 4 can take place through the belt-band-sensitive sensor, that is, through the mass disc 16, in that, with greatly accelerated pull-out of the belt band through mass inertia, the control disc 12, connected with the mass disc 16, remains behind the rotation movement of the belt spool 4 and through the associated relative movement between control disc 12 and belt spool the blocking catch is moved into the blocking position.

In FIGS. 2 to 4 is represented, in each case, how the control disc and mass disc are coupled together, so that, if a predetermined tightening-back acceleration is exceeded, the mass disc, overcoming the coupling force between mass disc and control disc, is rotatable in relation to the control disc, and the forces originating from the mass disc do not harm the parts arranged after it, such as the control disc, blocking catch and the like. As already mentioned, the control disc is supported on the belt spool 4 so that, to carry out the relative movement, it can rotate by a certain angular distance in relation to the belt spool, against the force of a spring. In normal operation, the control disc 12 rotates together with the belt spool 4. Here, the control disc is supported, for example, through the force of the said spring, against a stop, by which the control disc 12 is carried along in the winding and unwinding movement. With the release of one of the sensors, the control disc 12 is either blocked by means of the sensor 15 or braked by means of the mass inertia of the mass disc 16, so that between the belt spool 4, turning in the unwinding direction (arrow direction a), and the control disc 12, the relative movement necessary for the actuation of the blocking catch, takes place. In the tightening-back process, the belt spool 4 turns in the opposite direction b; that is, with this movement, the belt spool 4 carries the control disc 12 and the mass disc 16 with it. The coupling represented in FIGS. 2 to 4 has the effect that after the occurrence of the tightening-back pulse, the mass disc 16 need not take part in the rotary movement of the control disc 12.

Figure 2A:
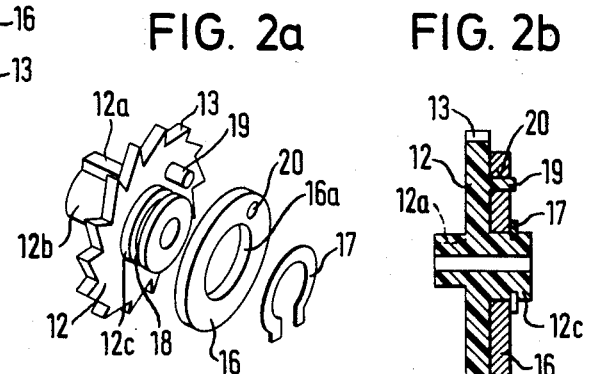
FIGS. 2a, 2b show a first form of the coupling between control disc and mass disc, in perspective and in section.
Figure 2B:
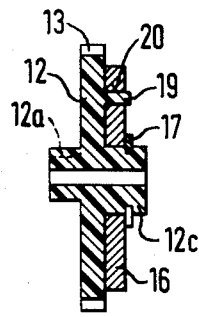

In the example according to FIGS. 2a and 2b, the control disc has, as in the other examples, an axial bearing addition 12b, by which the control disc 12 is supported rotatable, stop-limited, on the belt spool 4. On the other side, the control disc 12 has another bearing addition 12c, on which is supported rotatably a mass disc, provided with a corresponding bearing opening 16a. Through a spring-like axial securing 17, the mass disc 16 is held in the axial direction against the control disc 12. This axial securing 17 engages in a groove 18 of the bearing member 12c. On the control disc 12 is arranged, off-center, by injection molding, for example, a shear pin 19, which passes through an opening 20 in the mass disc 16 and, in the normal operation of the safety belt retractor, forms a carrier for the mass disc 16. With the occurrence of extreme angular accelerations in the tightening back process, the shear pin 19 breaks and allows free rotation of the mass disc 16. Through the tightening-back pulse, therefore, the relatively heavy mass disc 16, consisting of metal, for example, turns like a collision flywheel.

Figure 3A:
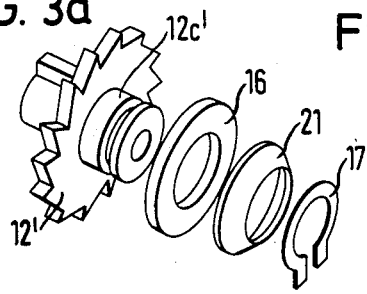
FIGS. 3a, 3b show a second form of the coupling between control disc and mass disc, by means of slide coupling, in perspective and in section.
Figure 3B:
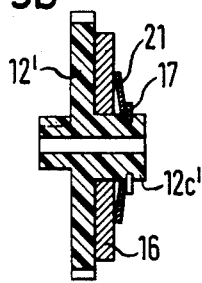
Figure 4C:
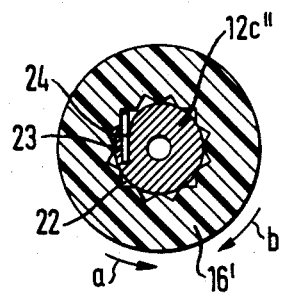
FIGS. 4a, 4b, 4c show a third form of the coupling by means of slide coupling, in perspective, side section and frontal section.
Figure 4A:
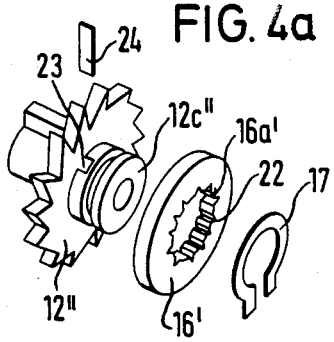
Figure 4B:
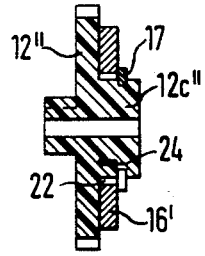

In the example according to FIGS. 3a and 3b, there is provided as a coupling between control disc 12' and the mass disc, a slide coupling in the form of a plate spring 21. This plate spring is supported on the bearing member 12c' of the control disc 12' and under spring tension of the axial securing 17 in relation to the mass disc 16. Through the increased friction forces coming from the plate spring 21, the mass disc is carried along by the control disc 12' in normal operation. Only with the occurrence of an increased angular acceleration are the friction forces overcome, and the control disc 12' then turns without the mass disc 16. In this way, the coupling between control disc 12' and mass disc 16 is retained, except in case of extreme angular acceleration, so that after the tightening-back process, the belt-band-sensitive sensor, in the form of the mass disc 16, can be effective.

In the example according to FIGS. 4a to 4c, again, the mass disc 16' is rotatably supported on a bearing member 12c'' of the control disc 12'', and secured axially through the axial securing 17. Here, the opening 16a' of the mass disc 16' has inner teeth 22. In the bearing member 12c'', that is, in the bearing hub of the control disc 16', is a substantially tangential opening 23, into which is plugged and blocked a ratchet spring 24, designed as a spring plate of metal or plastic. This ratchet spring 24 is resiliently engaged, by the free end of the spring, with the teeth 22 of the mass disc 16' so that, with normal rotation of the belt spool 4, the blocking process, that is, with rotation of the belt spool 4 in the arrow direction a according to FIG. 1, there is a solid coupling engagement between the control disc 12'' and the mass disc 16'; that is, both parts are joined together, secure against rotation. Only with the extremely rapid rotation of the belt spool in the direction b, that is, in the tightening-back process, is the force of the coupling engagement of the ratchet spring 24 overcome, and the mass disc 16' is free from the control disc 12' and able to turn in relation to the control disc, or need not take part in the rotation movement of the control disc. With this, a ratchet coupling is obtained.

I claim:

1. A safety belt retractor for use in a vehicle, said safety belt retractor comprising a frame, a belt spool rotatably supported on said frame and spring biased in a rewind direction, an excessive deceleration sensitive belt slack retightening mechanism adapted to be positively coupled to said belt spool to drive said belt spool in a retightening direction upon occurrence of excessive deceleration of said vehicle, blocking means for blocking said belt spool from rotation relative to said frame, and control means for controlling said blocking means in response to acceleration of belt webbing withdrawal from said belt spool, said control means comprising a control disc supported for limited relative rotation with respect to said belt spool, said limited relative rotation controlling a spool blocking pawl, and an inertial disc coupled to said control disc for rotation therewith by a coupling means which permits rotation of said inertial disc with respect to said control disc only upon the exceeding of a predetermined retightening rotational acceleration of said belt spool and said control disc.

2. A safety belt retractor according to claim 1, with the distinction that said inertial disc is connected with said control disc through a shear pin which forms said coupling means, said shear pin breaking off if the predetermined retightening acceleration is exceeded.

3. A safety belt retractor according to claim 1, with the distinction that said inertial disc is connected with said control disc through a slide coupling which forms said coupling means.

4. A safety belt retractor according to claim 1, with the distinction that said inertial disc is connected with said control disc through a ratchet coupling which forms said coupling means and which allows only a relative rotation between the two discs in the retightening direction of rotation of said belt spool and said control disc.

5. A method of operating a vehicle safety belt retractor having a rotatable reel around which a safety belt is wound, a control disc which is connected with the reel, and a mass which is connected with the control disc, said method comprising the steps of rotating the reel at a first rate, rotating the control disc and mass together with the reel at the first rate, rotating the reel at a second rate which is greater than the first rate, rotating said control disc and mass together at a rate which is less than the second rate during rotation of the reel at the second rate while transmitting rotation retarding forces from the mass to the control disc, effecting operation of a blocking mechanism from a disengaged condition to an engaged condition to block rotation of the reel in response to rotation of the control disc and mass at a rate which is less than the second rate during rotation of the reel at the second rate, rotating the reel at a third rate which is greater than the second rate, rotating the control disc at the third rate during rotation of the reel at the third rate, and rotating the mass at a rate which is less than the rate of rotation of the control disc during rotation of the reel at the third rate to limit forces transmitted between the mass and control disc.

6. A method as set forth in claim 5 wherein said step of rotating the reel at a second rate includes the step of rotating the reel in a first direction under the influence of forces transmitted from the safety belt to the reel, said step of rotating the control disc and mass at a rate which is less than the second rate during rotation of the reel at the second rate includes rotating the mass and disc together in the first direction, said step of rotating the reel at a third rate includes the step of rotating the reel in a second direction which is opposite to the first direction, said step of rotating the control disc at the third rate during rotation of the reel at the third rate includes rotating the control disc in the second direction, said step of rotating the mass at a rate which is less than the rate of rotation of the control disc includes rotating the mass in the second direction at a rate which is less than the third rate during rotation of the control disc and reel in the second direction at the third rate.

7. A method as set forth in claim 6 wherein said step of rotating the reel at a third rate includes the steps of igniting a pyrotechnic propellant and transmitting forces generated as a result of ignition of the pyrotechnic propellant to the reel to rotate the reel in the second direction.

8. A method as set forth in claim 5 further including operating a sensor assembly to block rotation of said control disc and said mass upon the occurrence of a predetermined rate of vehicle deceleration.

* * * * *